(12) United States Patent
Schmitz et al.

(10) Patent No.: US 10,864,830 B2
(45) Date of Patent: Dec. 15, 2020

(54) RECLINER MECHANISM HAVING WELDED ENCAPSULATING RING

(71) Applicant: FISHER & COMPANY, INCORPORATED, St. Clair Shores, MI (US)

(72) Inventors: Ralph L. Schmitz, Clinton Township, MI (US); Sapan Mahendra Poptani, Northville, MI (US); Steven Anthony Hessell, Shelby Township, MI (US); Vicki Ann Wood, St. Clair Shores, MI (US)

(73) Assignee: FISHER & COMPANY, INCORPORATED, St. Clair Shores, MI (US)

( * ) Notice: Subject to any disclaimer, the term of this patent is extended or adjusted under 35 U.S.C. 154(b) by 12 days.

(21) Appl. No.: 16/378,950

(22) Filed: Apr. 9, 2019

(65) Prior Publication Data
US 2019/0329674 A1 Oct. 31, 2019

Related U.S. Application Data

(60) Provisional application No. 62/662,497, filed on Apr. 25, 2018.

(51) Int. Cl.
| | |
|---|---|
| *B60N 2/22* | (2006.01) |
| *B60N 2/20* | (2006.01) |
| *B60N 2/68* | (2006.01) |
| B60N 2/90 | (2018.01) |

(52) U.S. Cl.
CPC ............ *B60N 2/22* (2013.01); *B60N 2/20* (2013.01); *B60N 2/682* (2013.01); *B60N 2002/952* (2018.02); *B60N 2205/50* (2013.01)

(58) Field of Classification Search
CPC . B60N 2/22; B60N 2/20; B60N 2/682; B60N 2002/952; B60N 2205/50
USPC .................................................... 297/354.12
See application file for complete search history.

(56) References Cited

U.S. PATENT DOCUMENTS

| | | |
|---|---|---|
| 3,736,026 A | 5/1973 | Ziegler et al. |
| 3,953,069 A | 4/1976 | Tamura et al. |
| 4,219,234 A | 8/1980 | Bell |
| 4,243,264 A | 1/1981 | Bell |

(Continued)

FOREIGN PATENT DOCUMENTS

| | | |
|---|---|---|
| DE | 4324734 A1 | 1/1995 |
| DE | 102007002366 B3 | 7/2008 |

(Continued)

OTHER PUBLICATIONS

Office Action regarding Canadian Patent Application No. 2,812,408, dated Jun. 17, 2016.

(Continued)

*Primary Examiner* — Mark R Wendell
(74) *Attorney, Agent, or Firm* — Harness, Dickey & Pierce, P.L.C.

(57) ABSTRACT

The recliner mechanism includes a housing plate, a recliner heart and an encapsulating ring. The recliner heart is mounted to the housing plate and operable in an unlocked state permitting relative rotation between a seatback and a seat bottom and a locked state preventing relative rotation between the seatback and the seat bottom. The encapsulating ring is attached to the housing plate.

17 Claims, 8 Drawing Sheets

(56) References Cited

U.S. PATENT DOCUMENTS

| | | |
|---|---|---|
| 4,279,442 A | 7/1981 | Bell |
| 4,372,610 A | 2/1983 | Fisher, III et al. |
| 4,457,557 A | 7/1984 | Une |
| 4,484,779 A | 11/1984 | Suzuki |
| 4,579,387 A | 4/1986 | Bell |
| 4,634,182 A | 1/1987 | Tanaka |
| 4,684,174 A | 8/1987 | Bell |
| 4,705,319 A | 11/1987 | Bell |
| 4,720,145 A | 1/1988 | Bell |
| 4,733,912 A | 3/1988 | Secord |
| 4,747,641 A | 5/1988 | Bell |
| 4,795,213 A | 1/1989 | Bell |
| 4,822,100 A | 4/1989 | Bell |
| 4,919,482 A | 4/1990 | Landis et al. |
| 4,928,374 A | 5/1990 | Allen |
| 5,007,680 A | 4/1991 | Miyauchi et al. |
| 5,044,647 A | 9/1991 | Patterson |
| 5,154,476 A | 10/1992 | Haider et al. |
| 5,240,309 A | 8/1993 | Kojer |
| 5,248,184 A | 9/1993 | Morris |
| 5,265,937 A | 11/1993 | Allen |
| 5,393,116 A | 2/1995 | Bolsworth et al. |
| 5,419,616 A | 5/1995 | Paetzold |
| 5,435,624 A | 7/1995 | Bray et al. |
| 5,460,429 A | 10/1995 | Whalen |
| 5,489,141 A | 2/1996 | Strausbaugh et al. |
| 5,577,805 A | 11/1996 | Glinter et al. |
| 5,590,932 A | 1/1997 | Olivieri |
| 5,622,410 A | 4/1997 | Robinson |
| 5,628,215 A | 5/1997 | Brown |
| 5,660,440 A | 8/1997 | Pejathaya |
| 5,718,481 A | 2/1998 | Robinson |
| 5,769,493 A | 6/1998 | Pejathaya |
| 5,788,330 A | 8/1998 | Ryan |
| 5,823,622 A | 10/1998 | Fisher, IV et al. |
| 5,918,939 A | 7/1999 | Magadanz |
| 5,927,809 A | 7/1999 | Tame |
| 5,941,591 A | 8/1999 | Tsuge et al. |
| 5,947,560 A | 9/1999 | Chen |
| 5,979,986 A | 11/1999 | Pejathaya |
| 6,023,994 A | 2/2000 | Yoshida |
| 6,047,444 A | 4/2000 | Braun |
| 6,068,341 A | 5/2000 | Rink |
| 6,074,009 A | 6/2000 | Farino |
| 6,095,609 A | 8/2000 | Magadanz |
| 6,106,067 A | 8/2000 | Zhuang et al. |
| 6,123,380 A | 9/2000 | Sturt et al. |
| 6,139,104 A | 10/2000 | Brewer |
| 6,158,800 A | 12/2000 | Tsuge et al. |
| 6,161,899 A | 12/2000 | Yu |
| 6,199,953 B1 | 3/2001 | Chen |
| 6,250,704 B1 | 6/2001 | Garrido |
| 6,290,297 B1 | 9/2001 | Yu |
| 6,328,381 B1 | 12/2001 | Smuk |
| 6,345,867 B1 | 2/2002 | Hellrung et al. |
| 6,447,066 B1 | 9/2002 | Chabanne et al. |
| 6,511,129 B1 | 1/2003 | Minor et al. |
| 6,533,357 B2 | 3/2003 | Pospeshil et al. |
| 6,550,864 B1 | 4/2003 | Zarna et al. |
| 6,554,362 B1 | 4/2003 | Pospeshil |
| 6,669,299 B2 | 12/2003 | Carlson et al. |
| 6,698,837 B2 | 3/2004 | Pejathaya et al. |
| 6,854,802 B2 | 2/2005 | Matsuura et al. |
| 6,857,703 B2 | 2/2005 | Bonk |
| 6,860,562 B2 | 3/2005 | Bonk |
| 6,869,143 B2 | 3/2005 | Secord |
| 6,908,156 B1 | 6/2005 | Park et al. |
| 7,025,422 B2 | 4/2006 | Fast |
| 7,093,901 B2 | 8/2006 | Yamada |
| 7,097,253 B2 | 8/2006 | Coughlin et al. |
| 7,100,987 B2 | 9/2006 | Volker et al. |
| 7,121,624 B2 | 10/2006 | Pejathaya et al. |
| 7,152,924 B1 | 12/2006 | Nemoto |
| 7,172,253 B2 | 2/2007 | Haverkamp |
| 7,198,330 B2 | 4/2007 | Wahlen et al. |
| 7,293,838 B2 | 11/2007 | Sugama |
| 7,296,857 B2 | 11/2007 | Shinozaki et al. |
| 7,300,109 B2 | 11/2007 | Hofmann et al. |
| 7,306,286 B2 | 12/2007 | Syrowik et al. |
| 7,328,954 B2 | 2/2008 | Sasaki et al. |
| 7,419,217 B2 | 9/2008 | Ishizuka |
| 7,458,639 B2* | 12/2008 | Thiel .............. B60N 2/20 297/367 R |
| 7,490,907 B2 | 2/2009 | Nagura et al. |
| 7,503,099 B2 | 3/2009 | Pejathaya |
| 7,527,336 B2 | 5/2009 | Kienke et al. |
| 7,578,556 B2 | 8/2009 | Ohba et al. |
| 7,604,297 B2 | 10/2009 | Weber |
| 7,695,068 B2 | 4/2010 | Maeda et al. |
| 7,775,591 B2 | 8/2010 | Hahn |
| 7,976,103 B2 | 7/2011 | Gamache et al. |
| 8,052,215 B2 | 11/2011 | Ito |
| 8,360,527 B2 | 1/2013 | Lehmann |
| 9,227,532 B2 | 1/2016 | Balzar |
| 9,555,725 B2 | 1/2017 | Rothstein |
| 9,889,774 B2 | 2/2018 | Espinosa et al. |
| 2003/0127898 A1 | 7/2003 | Niimi et al. |
| 2005/0253439 A1 | 11/2005 | Sasaki et al. |
| 2006/0006718 A1 | 1/2006 | Umezaki |
| 2006/0012232 A1 | 1/2006 | Coughlin et al. |
| 2006/0055223 A1 | 3/2006 | Thiel |
| 2006/0170269 A1* | 8/2006 | Oki ................ B60N 2/2252 297/367 R |
| 2007/0138854 A1 | 6/2007 | Paing et al. |
| 2007/0200408 A1 | 8/2007 | Ohta et al. |
| 2008/0164741 A1* | 7/2008 | Sakamoto ............ B60N 2/2231 297/362 |
| 2010/0096896 A1* | 4/2010 | Nonomiya ........... B60N 2/2356 297/362 |
| 2010/0231021 A1 | 9/2010 | Myers et al. |
| 2010/0320823 A1 | 12/2010 | Thiel |
| 2011/0068612 A1 | 3/2011 | Thiel |
| 2011/0127814 A1 | 6/2011 | Thiel |
| 2012/0248841 A1 | 10/2012 | Hellrung et al. |
| 2013/0207434 A1* | 8/2013 | Stilleke ............... B60N 2/2252 297/362 |
| 2013/0270884 A1 | 10/2013 | Espinosa et al. |
| 2014/0138998 A1 | 5/2014 | Christoffel |
| 2015/0015044 A1 | 1/2015 | Teufel |
| 2015/0266398 A1* | 9/2015 | Higashi ................. B60N 2/236 297/367 R |
| 2015/0306986 A1* | 10/2015 | Jarry ..................... B60N 2/68 297/362 |
| 2016/0339810 A1 | 11/2016 | Pluta |
| 2017/0037945 A1 | 2/2017 | Maeda et al. |
| 2017/0088021 A1 | 3/2017 | Noguchi |
| 2017/0136921 A1 | 5/2017 | Dill |
| 2018/0103760 A1* | 4/2018 | Fujita ..................... A47C 1/025 |
| 2019/0255979 A1* | 8/2019 | Zahn .................... B21F 37/00 |
| 2019/0337424 A1* | 11/2019 | Chang .................. B60N 2/20 |
| 2020/0047644 A1 | 2/2020 | Schmitz et al. |
| 2020/0070689 A1 | 3/2020 | Naik et al. |

FOREIGN PATENT DOCUMENTS

| | | |
|---|---|---|
| DE | 102008026176 A1 | 12/2009 |
| GB | 1546104 A | 5/1979 |
| KR | 100601809 B1 | 7/2006 |
| KR | 100817000 B1 | 3/2008 |
| KR | 20090035633 A | 4/2009 |
| KR | 20140001651 A | 1/2014 |
| KR | 101420164 B1 | 7/2014 |
| KR | 101655777 B1 | 9/2016 |
| WO | WO-9620848 A1 | 7/1996 |
| WO | WO-2011069107 A2 | 6/2011 |

OTHER PUBLICATIONS

U.S. Appl. No. 16/740,874, filed Jan. 13, 2020, Ralph L. Schmitz et al.

U.S. Appl. No. 16/811,112, filed Mar. 6, 2020, Ralph L. Schmitz et al.

(56) References Cited

OTHER PUBLICATIONS

U.S. Appl. No. 16/842,135, filed Apr. 7, 2020, Ralph L. Schmitz et al.
Office Action regarding German Patent Application No. 102016114406.1, dated Apr. 27, 2020. Translation provided by Witte, Weller & Partner Patentanwälte mbB.
International Search Report regarding International Application No. PCT/US2020/021377, dated Jun. 30, 2020.
Written Opinion of the International Searching Authority regarding International Application No. PCT/US2020/021377, dated Jun. 30, 2020.

* cited by examiner

RECLINER MECHANISM HAVING WELDED ENCAPSULATING RING

CROSS-REFERENCE TO RELATED APPLICATIONS

This application claims the benefit of U.S. Provisional Application No. 62/662,497, filed on Apr. 25, 2018. The entire disclosure of the above application is incorporated herein by reference.

FIELD

The present disclosure relates to a recliner mechanism having a welded encapsulating ring.

BACKGROUND

This section provides background information related to the present disclosure which is not necessarily prior art.

Vehicle seats often include a recliner mechanism that can rotate a seatback relative to a seat bottom. Some of such vehicle recliner mechanisms are time consuming to manufacture and are subject to impairment during the manufacturing process. The present disclosure provides a recliner mechanism that reduces manufacturing time thereof and reduces impairment thereto during manufacturing.

SUMMARY

This section provides a general summary of the disclosure, and is not a comprehensive disclosure of its full scope or all of its features.

In one form, the present disclosure provides a recliner mechanism that includes a housing plate, a recliner heart and an encapsulating ring. The recliner heart is mounted to the housing plate and operable in an unlocked state permitting relative rotation between a seatback and a seat bottom and a locked state preventing relative rotation between the seatback and the seat bottom. The encapsulating ring is contacting and fixed to the housing plate.

In some configurations of the recliner mechanism of the above paragraph, the encapsulating ring includes a body and first and second flanges.

In some configurations of the recliner mechanism of any one or more of the above paragraphs, the first flange extends radially outwardly from an axial end of the body and the second flange extends radially inwardly from another axial end of the body.

In some configurations of the recliner mechanism of any one or more of the above paragraphs, the laser beam contacts a portion of the first flange and a portion of the housing plate to attach the encapsulating ring and the housing plate.

In some configurations of the recliner mechanism of any one or more of the above paragraphs, the laser beam contacts only the first flange of the encapsulating ring to attach the encapsulating ring and the housing plate.

In some configurations of the recliner mechanism of any one or more of the above paragraphs, the first flange extends at least partially around the body.

In some configurations of the recliner mechanism of any one or more of the above paragraphs, the first flange extends between 180 degrees and 360 degrees around the body.

In some configurations of the recliner mechanism of any one or more of the above paragraphs, the encapsulating ring surrounds a periphery of recliner heart.

In some configurations of the recliner mechanism of any one or more of the above paragraphs, the recliner heart is disposed between the encapsulating ring and the housing plate.

In some configurations of the recliner mechanism of any one or more of the above paragraphs, the encapsulating ring includes a body and a flange. The flange extends radially outwardly from an axial end of the body.

In some configurations of the recliner mechanism of any one or more of the above paragraphs, a first weld is between the flange of the encapsulating ring and the housing plate.

In some configurations of the recliner mechanism of any one or more of the above paragraphs, a laser beam contacts only the flange of the encapsulating ring to attach the encapsulating ring and the housing plate.

In some configurations of the recliner mechanism of any one or more of the above paragraphs, the flange extends at least partially around the body.

In some configurations of the recliner mechanism of any one or more of the above paragraphs, the recliner heart includes a first plate and a second plate. A weld is between the body of the encapsulating ring and the first plate.

In some configurations of the recliner mechanism of any one or more of the above paragraphs, the recliner heart includes a first plate and a second plate. A second weld is between the body of the encapsulating ring and the first plate.

In another form, the present disclosure provides a recliner mechanism that includes a first bracket plate, a second bracket plate, a recliner heart and an encapsulating ring. The recliner heart mounted to the first and second bracket plates and operable in an unlocked state permitting relative rotation between a seatback and a seat bottom and a locked state preventing relative rotation between the seatback and the seat bottom. The encapsulating ring disposed between the first and second bracket plates. The encapsulating ring contacting and fixed to the first bracket plate.

In some configurations of the recliner mechanism of the above paragraph, the encapsulating ring includes a body and a flange. The flange extends radially outwardly from an axial end of the body.

In some configurations of the recliner mechanism of any one or more of the above paragraphs, a first weld is between the flange of the encapsulating ring and the first bracket plate.

In some configurations of the recliner mechanism of any one or more of the above paragraphs, the recliner heart includes a first plate and a second plate rotatable relative to the first plate. A second weld is between the body of the encapsulating ring and the first plate to attach the encapsulating ring to the first plate.

In some configurations of the recliner mechanism of any one or more of the above paragraphs, a third weld is between the second bracket plate and the second plate to attach the second bracket plate to the second plate.

In some configurations of the recliner mechanism of any one or more of the above paragraphs, a laser beam contacts only the flange of the encapsulating ring to attach the encapsulating ring and the first bracket plate.

In some configurations of the recliner mechanism of any one or more of the above paragraphs, the recliner heart includes a first plate and a second plate rotatable relative to the first plate. A laser beam contacts a portion of the first plate and a portion of the body to attach the encapsulating ring to the first plate.

In some configurations of the recliner mechanism of any one or more of the above paragraphs, the first plate includes a plate surface and a rim extending around the plate surface. The rim is the portion of the first plate that the laser beam contacts.

In some configurations of the recliner mechanism of any one or more of the above paragraphs, the first plate includes a plate surface and a rim extending around the plate surface. The weld is between the rim and the body of the encapsulating ring.

In some configurations of the recliner mechanism of any one or more of the above paragraphs, the second plate includes a plate surface and a rim extending around the plate surface. The rim is the portion of the second plate that the laser beam contacts.

In some configurations of the recliner mechanism of any one or more of the above paragraphs, the second plate includes a plate surface and a rim extending around the plate surface. The weld is between the plate surface and the second bracket plate.

In yet another form, the present disclosure provides a method for assembling a recliner mechanism. The method includes attaching an encapsulating ring of the recliner mechanism to a recliner heart of the recliner mechanism; attaching the encapsulating ring to a first bracket plate of the recliner mechanism while simultaneously attaching the recliner heart to a second bracket plate of the recliner mechanism. The encapsulating ring covering a periphery of the recliner heart. The recliner heart and the encapsulating ring are disposed between the first and second bracket plates when the encapsulating ring is attached to the first bracket plate and the recliner heart is attached to the second bracket plate.

In some configurations of the method of the above paragraph, the encapsulating ring and the recliner heart are attached by laser welding such that a laser beam contacts a portion of the encapsulating ring and a portion of the recliner heart.

In some configurations of the method of any one or more of the above paragraphs, the encapsulating ring and the first bracket plate are attached by laser welding such that a first laser beam contacts a portion of the encapsulating ring and a portion of the first bracket plate. The recliner heart and the second bracket plate are attached by laser welding such that a second laser beam contacts a portion of the recliner heart and a portion of the second bracket plate.

In some configurations of the method of any one or more of the above paragraphs, the encapsulating ring includes a body and a flange extending radially outwardly from an axial end of the body. The recliner heart includes a first plate and a second plate rotatable relative to the first plate.

In some configurations of the method of any one or more of the above paragraphs, the laser beam contacts a portion of the body and a portion of the first plate to attach the encapsulating ring to the first plate.

In some configurations of the method of any one or more of the above paragraphs, the encapsulating ring includes a body and a flange extending radially outwardly from an axial end of the body. The recliner heart includes a first plate and a second plate rotatable relative to the first plate.

In some configurations of the method of any one or more of the above paragraphs, the first laser beam contacts a portion of the flange and a portion of the first bracket plate to attach the encapsulating ring to the first bracket plate.

In some configurations of the method of any one or more of the above paragraphs, the second laser beam contacts a portion of the second plate and a portion of the second bracket plate to attach the recliner heart to the second bracket plate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
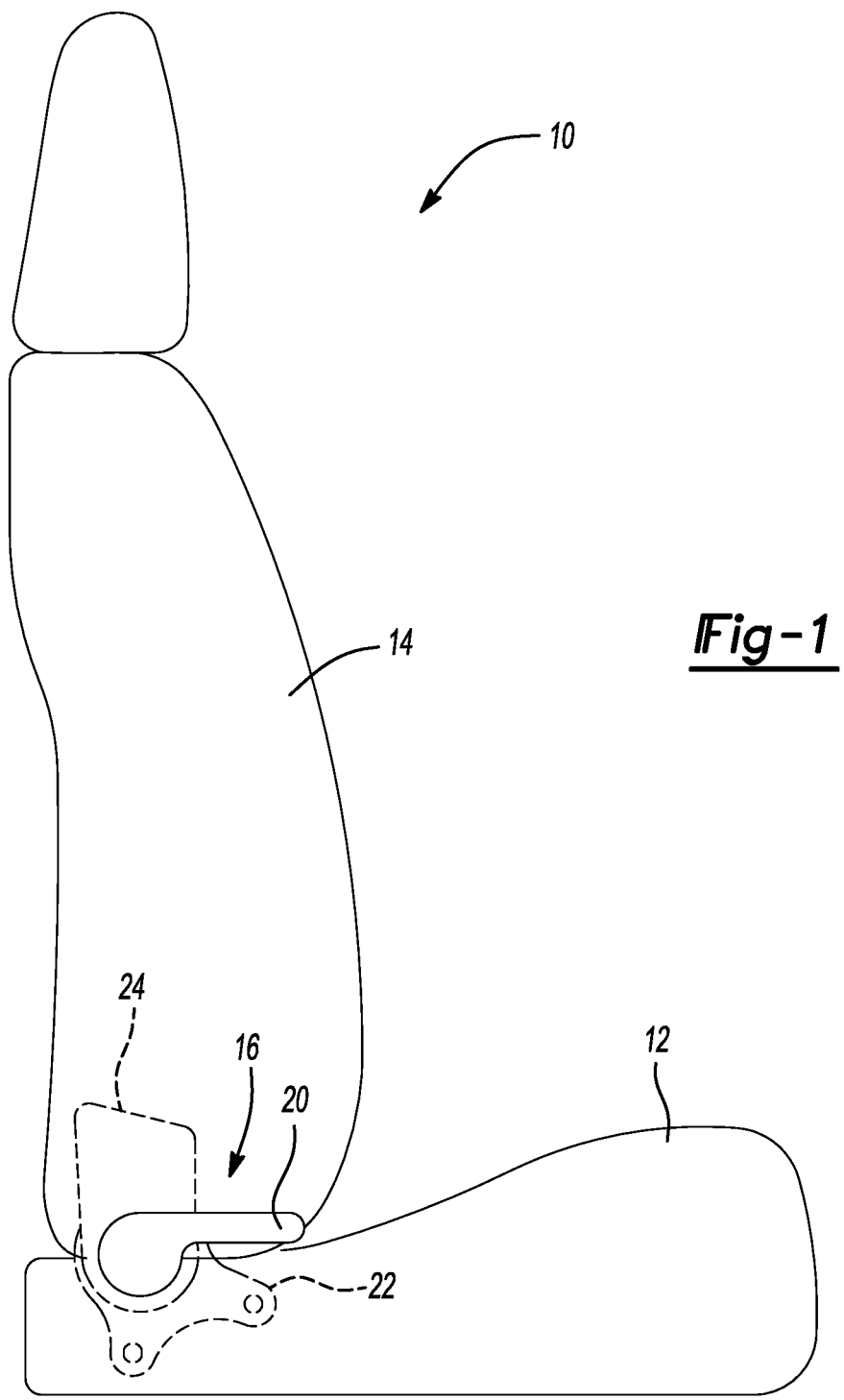
FIG. 1 is a side view of a vehicle seat assembly having a recliner assembly according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-5, a vehicle seat assembly 10 is shown (FIG. 1). The vehicle seat assembly 10 may be positioned within a vehicle (not shown) and may include a seat bottom 12, a seatback 14 and a seat recliner assembly 16. The seat recliner assembly 16 is connected to the seat bottom 12 and the seatback 14 and can be actuated to allow movement of the seatback relative to the seat bottom 12 among an upright position (FIG. 1), a rearward reclined position and a forward dump position. The seat recliner assembly 16 may include a recliner mechanism 18 (FIGS. 2-5) and a hand lever 20 (FIG. 1) connected to the recliner mechanism 18.

With reference to FIGS. 2-7, the recliner mechanism 18 may include a first bracket plate 22 (or housing plate), a second bracket plate 24, a recliner heart 26 (FIGS. 2 and 3), a hub 27 (FIGS. 2-5) and an encapsulating ring 28. The first and second bracket plates 22, 24 are mounted to the recliner heart 26. The first bracket plate 22 may be fixedly mounted to the seat bottom 12 and include a first portion 30 and a second portion 32. The first portion 30 may include a slot 34 and a plurality of apertures 36a, 36b formed therein. A tab 37 may extend through the slot 34 formed in the first portion 30 and may include a first member 38a and a second member 38b extending perpendicularly from the first member 38a. The first member 38a extends through the slot 36 and limits or restricts the rotation of the seatback 14 in the rearward reclined position and the forward dump position. The second member 38b may include an aperture 40 that aligns with the aperture 36b of the first portion 30 once the first member 38a extends through the slot 36. A first fastener (not shown) may extend through the aperture 36a to securely attach the first bracket plate 22 to the seat bottom 12 and a second fastener (not shown) may extend through the apertures 36b, 40 to securely attach the first bracket plate 22 and the tab 37 to the seat bottom 12.

Figure 2:
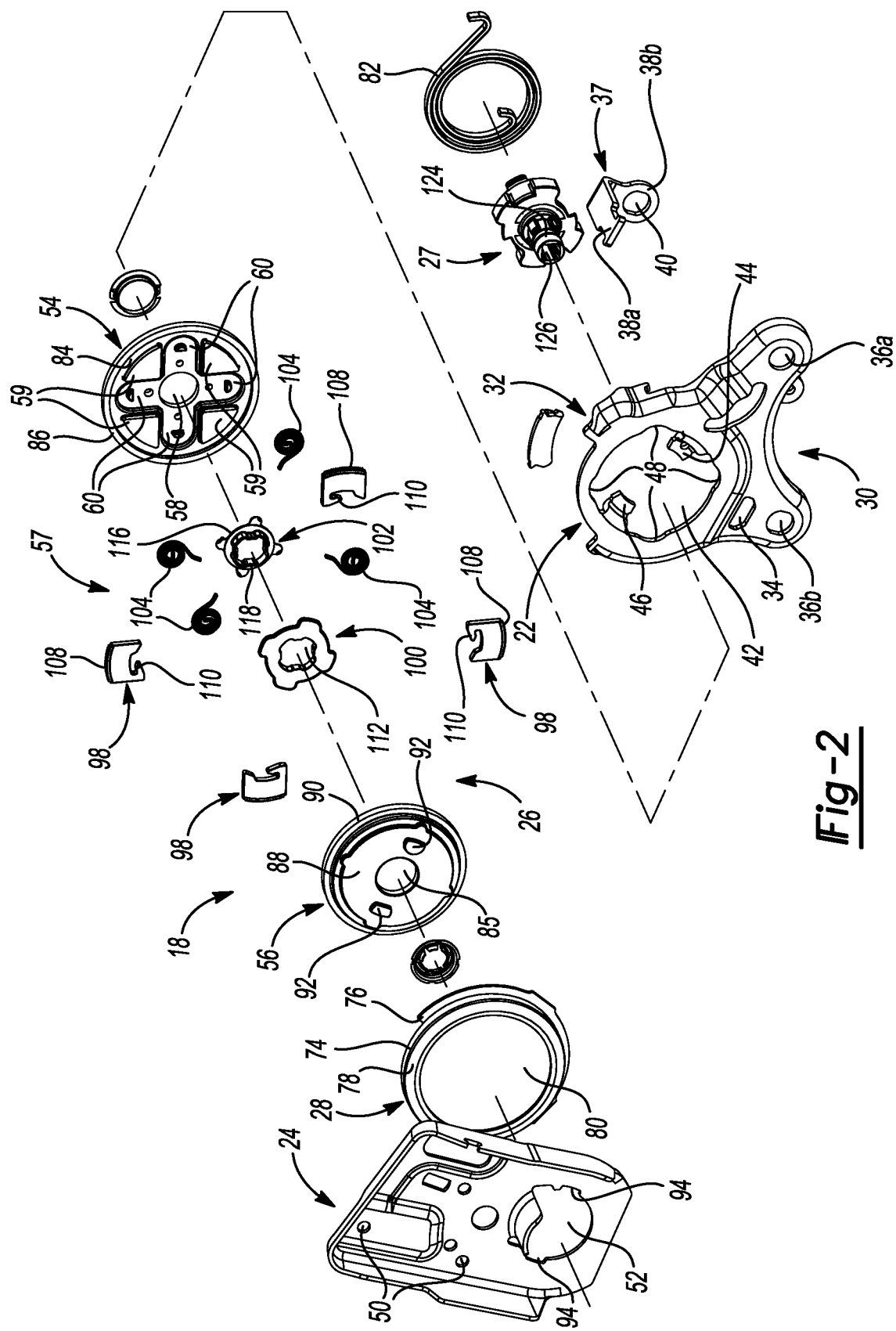
FIG. 2 is an exploded view of a recliner mechanism of the recliner assembly of FIG. 1.
Figure 3:
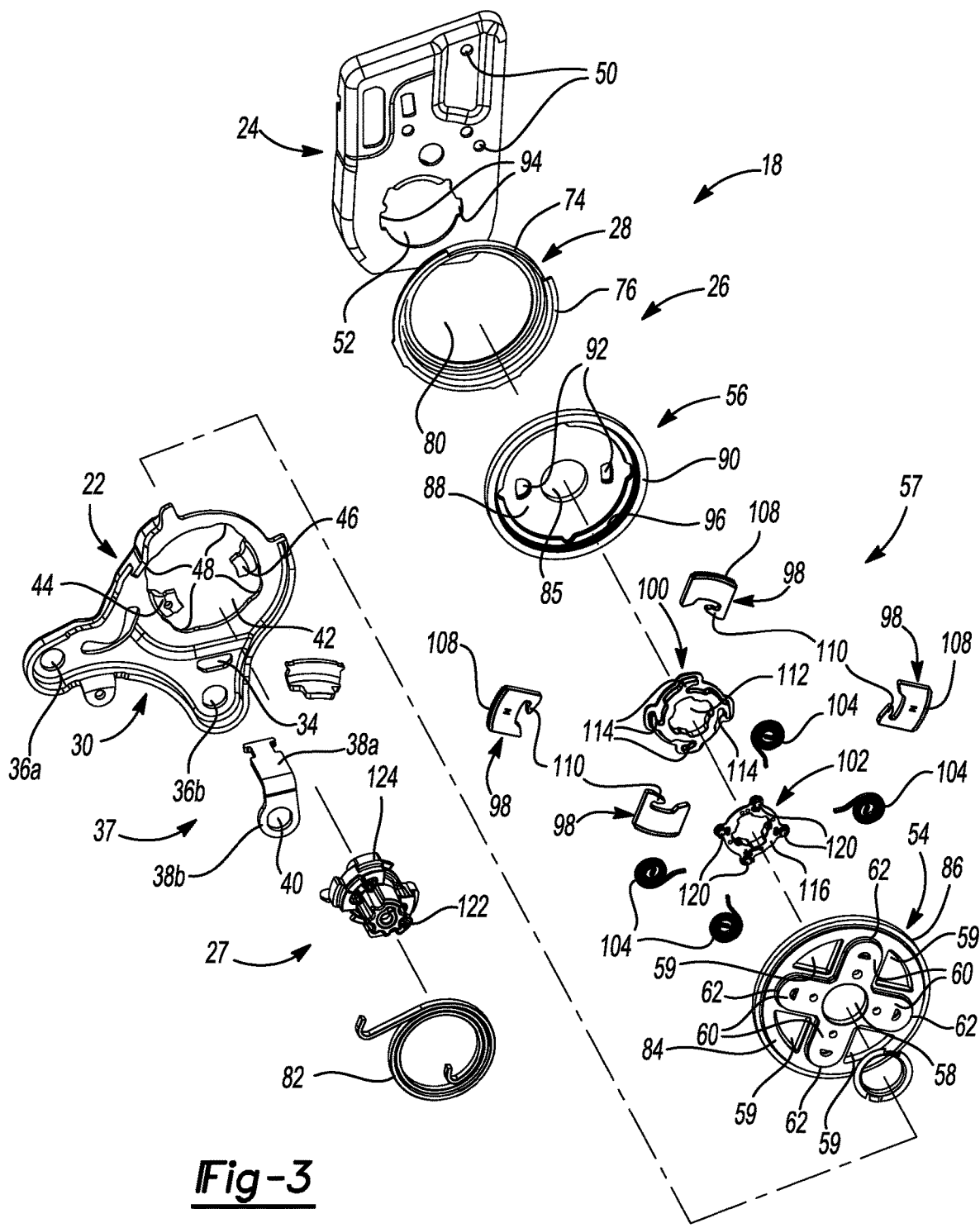
FIG. 3 is another exploded view of the recliner mechanism of the recliner assembly.
Figure 4:
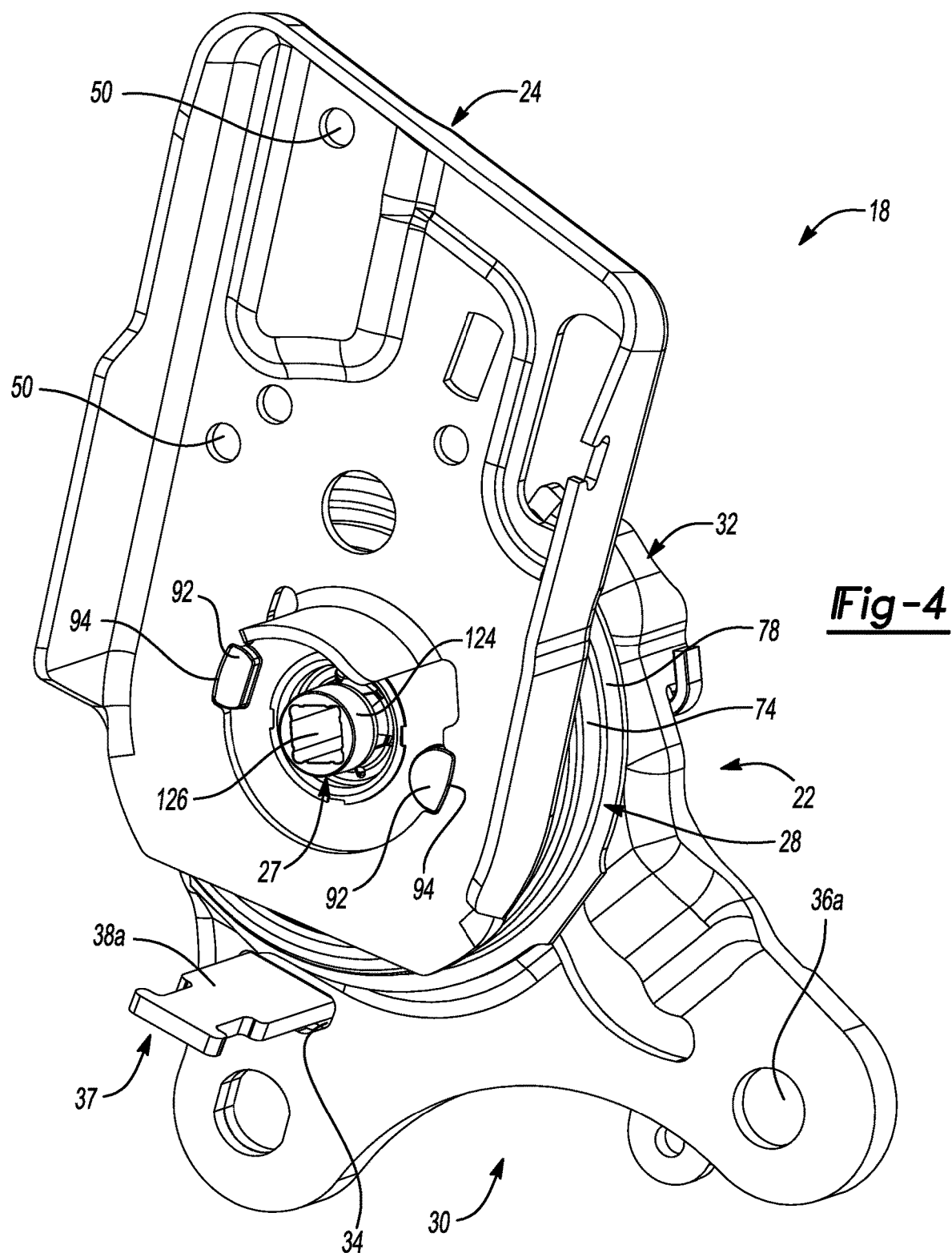
FIG. 4 is a perspective view of the recliner mechanism assembled.
Figure 5:
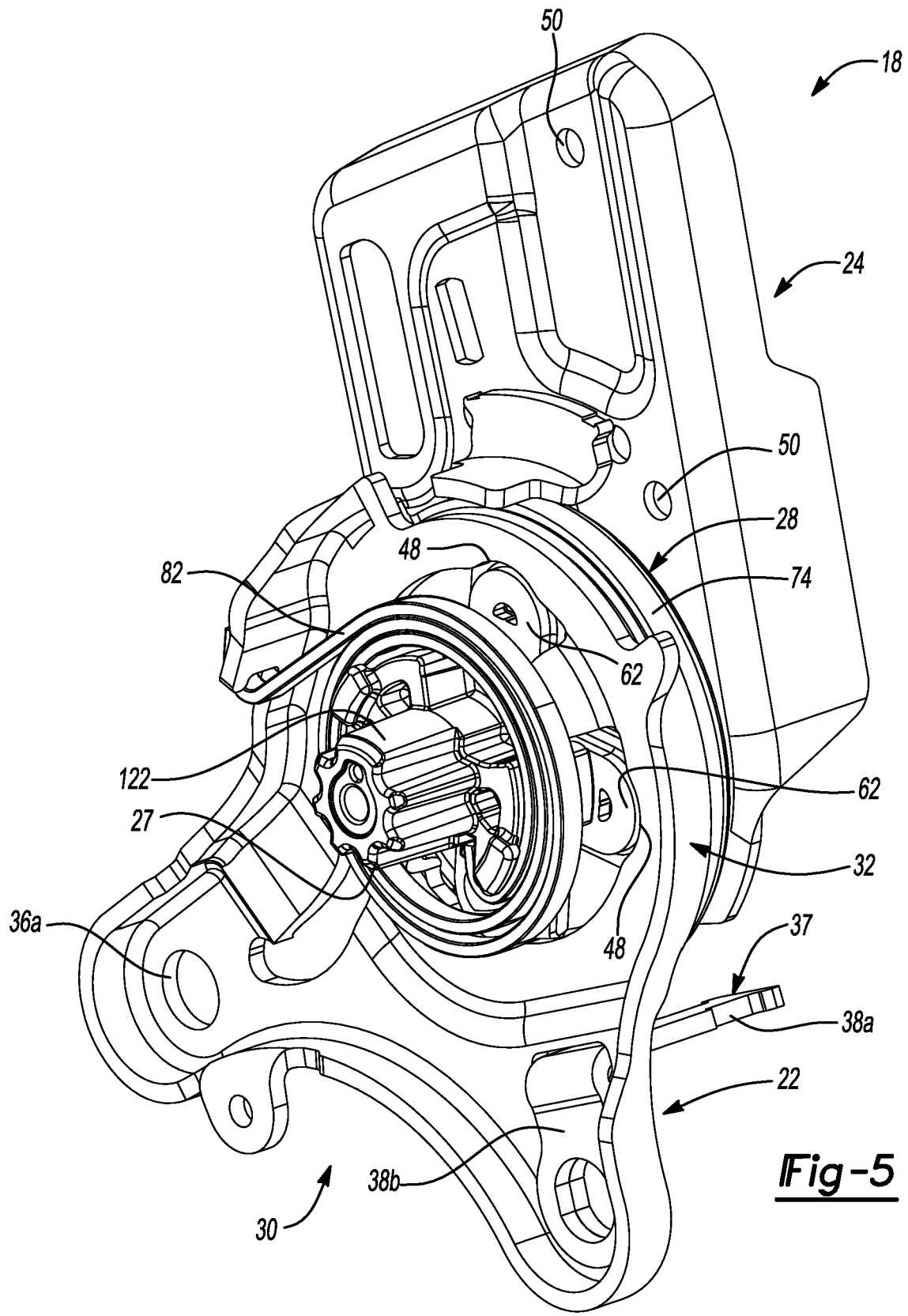
FIG. 5 is another perspective view of the recliner mechanism assembled.

The second portion 32 may be substantially circular and define an opening 42 in a central portion thereof. The second portion 32 may include first and second flanges 44, 46 (FIGS. 2 and 3) and a plurality of grooves 48 (FIGS. 2, 3 and 5). The first and second flanges 44, 46 may extend perpendicularly from a periphery of the opening 42 toward each other. The plurality of grooves 48 may be formed in the second portion 32 at or near the periphery of the opening 42.

The second bracket plate 24 may be generally rectangular and may include a plurality of apertures 50 (FIGS. 2-5) and a central aperture 52 (FIGS. 2 and 3) through which a cross member (not shown) extends. Fasteners (not shown) may extend through the plurality of apertures 50 to securely attach the second bracket plate 24 the seatback 14.

The recliner heart 26 may be mounted to the first and second bracket plates 22, 24 and may be operable in an unlocked state permitting relative rotation between the seatback 14 and the seat bottom 12 and a locked state preventing relative rotation between the seatback 14 and the seat bottom 12. The recliner heart 26 may be a round recliner heart, for example, or any other suitable type of recliner heart. As shown in FIGS. 2 and 3, the recliner heart 26 may include a first plate 54, a second plate 56 and a locking mechanism 57.

The first plate 54 may be rotationally fixed relative to the seat bottom 12 and may be attached to the encapsulating ring 28. The first plate 54 may include a plate surface 84 and a rim 86. The plate surface 84 may include an aperture 58, a plurality of triangular-shaped bosses 59 and a plurality of mounting members 60 having mounting ends 62. The aperture 58 may extend through a center portion of the plate surface 84. The plurality of bosses 59 may be disposed radially around the aperture 58 and may extend from the plate surface 84, thereby defining a recess. Each recess may be disposed between two of the plurality of bosses 59.

Figure 6:
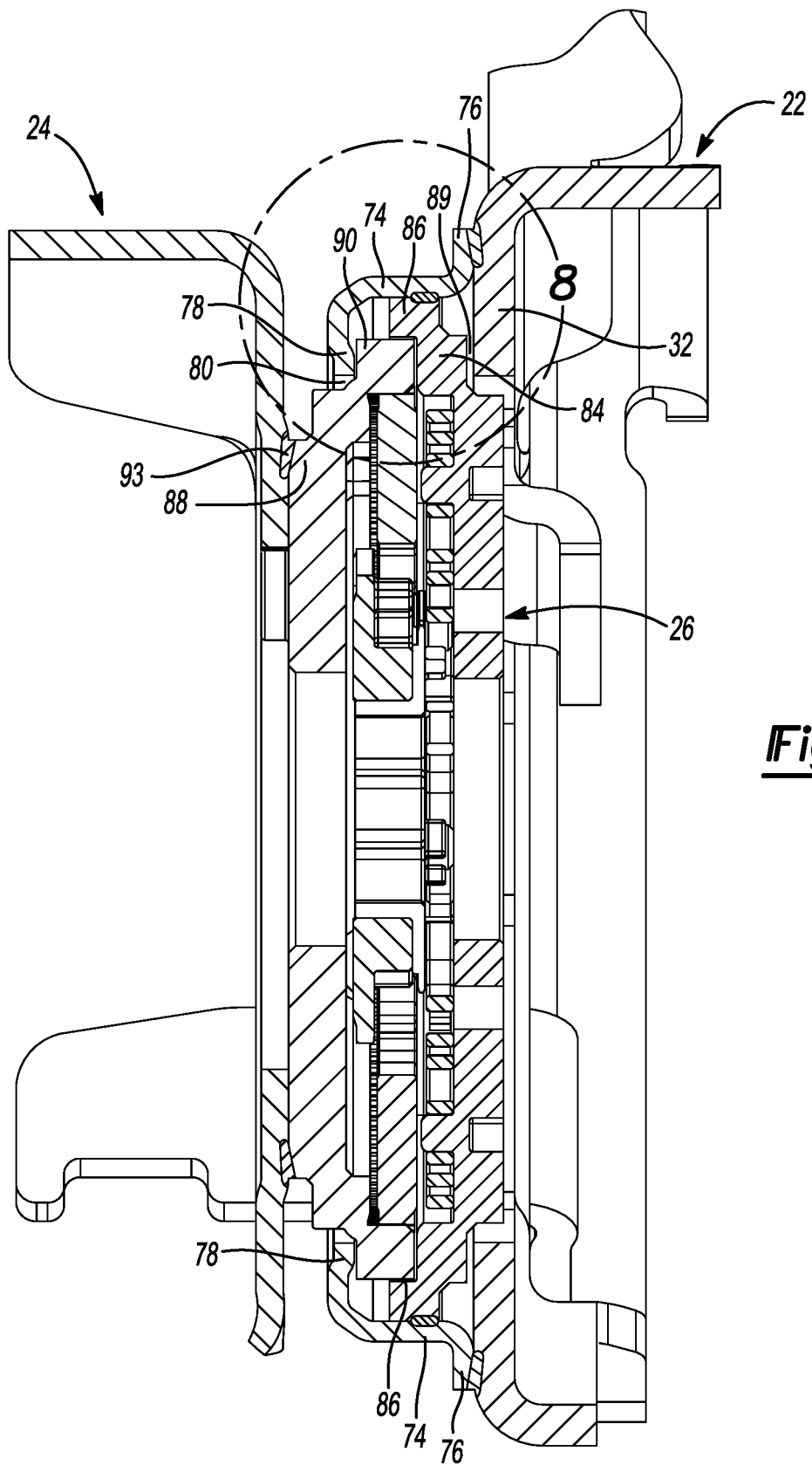
FIG. 6 is a cross-sectional view of the recliner mechanism.
Figure 7:
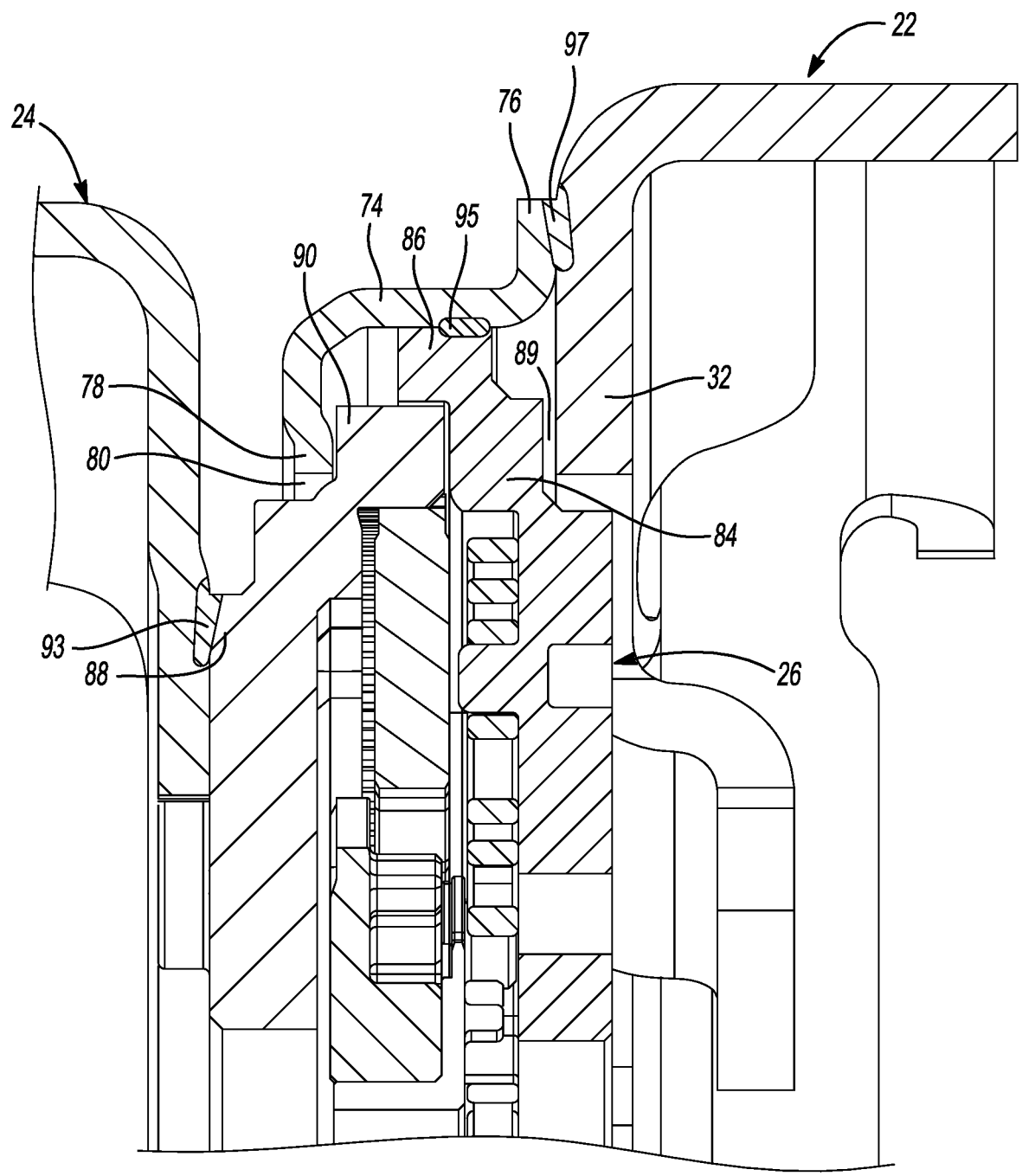
FIG. 7 is a cross-sectional view of a portion of the recliner mechanism shown in FIG. 6.
Figure 8:
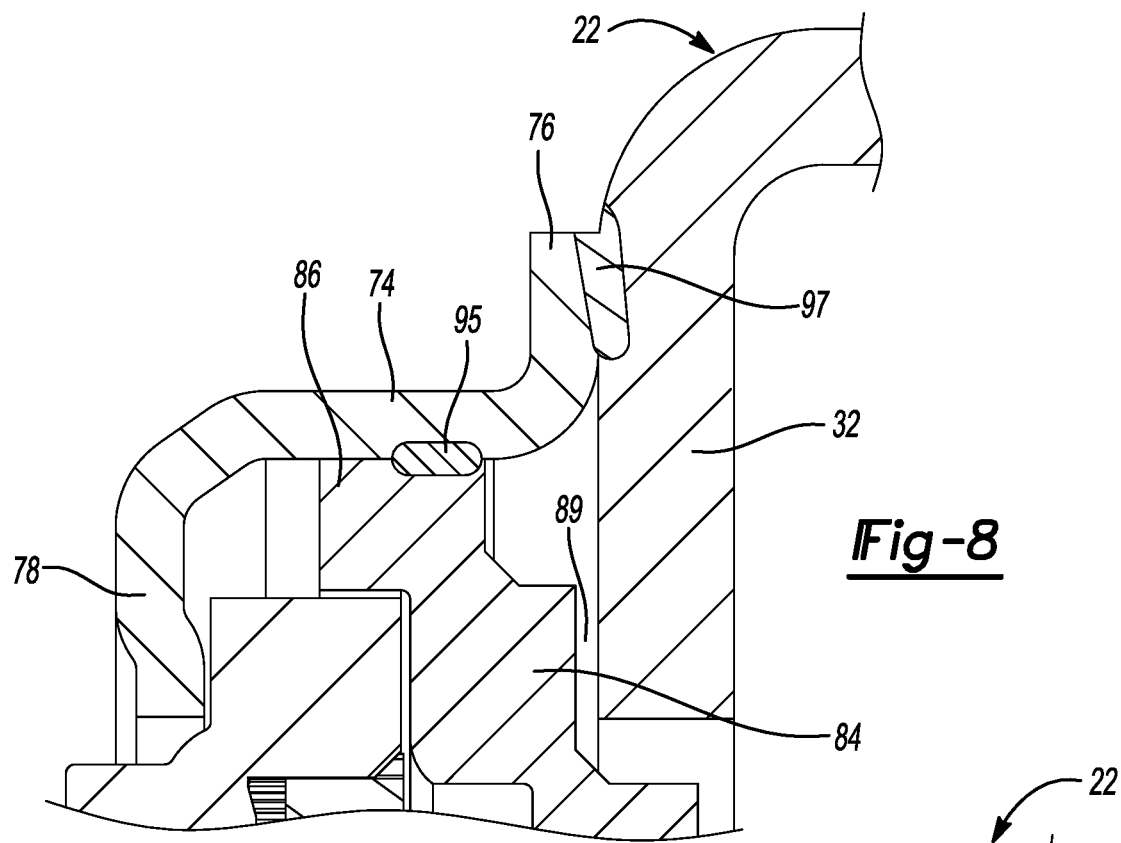
FIG. 8 is a close-up view of a portion of the recliner mechanism indicated as area 8 shown in FIG. 6.

The plurality of mounting members 60 may extend from the plate surface 84 opposite the direction of the bosses 59. The mounting members 60 may extend from the plate surface 84 such that each mounting end 62 is configured to be mounted into a corresponding groove 48 of the first bracket plate 22 (FIG. 5). As shown in FIGS. 6-8, a gap 89 may be defined between the plate surface 84 and the second portion 32 of the first bracket plate 22. The rim 86 may extend 360 degrees around a periphery of the plate surface 84 and may be attached to the encapsulating ring 28.

The second plate 56 may be rotationally fixed to the seatback 14 and may be a generally round, flat disk. The second plate 56 may include a plate surface 88 and a rim 90. The plate surface 88 may include an aperture 85 extending through a center portion thereof and a plurality of projections 92 extending from the plate surface 88 opposite the direction of the rim 90. The plurality of projections 92 may be received in corresponding grooves 94 of the second bracket plate 24 once the recliner heart 26 is mounted to the second bracket plate 24.

The second bracket plate 24 and the plate surface 88 of the second plate 56 may be attached by laser welding such that a laser beam contacts a portion of the second bracket plate 24 and a portion of the plate surface 88 of the second plate 56. In this way, material from the second bracket plate 24 and material from the plate surface 88 of the second plate 56 are melted in the area of contact between the second bracket plate 24 and the plate surface 88 of the second plate 56 to form a weld 93 therebetween, which reduces heat and time required to join the second bracket plate 24 and the second plate 56. Joining the second bracket plate 24 and the second plate 56 as described above also increases torque strength between the second bracket plate 24 and the second plate 56. Joining the second bracket plate 24 and the second plate 56 as described above also reduces the exposure of surrounding parts to heat, which increase durability of the recliner mechanism 18 by avoiding heat related distortions and stresses to the surrounding parts. The rim 90 may extend 360 degrees around a periphery of the plate surface 88 and may include an inner diametrical surface having teeth 96 (FIG. 3).

The locking mechanism 57 may include a plurality of pawls 98, a cam 100, a connector disk 102 and a plurality of coil springs 104. The plurality of pawls 98 may be radially disposed around the central aperture 58 of the first plate 54 and may be slidably mounted in a respective recess of the first plate 54. An edge of each pawl 98 may include teeth 108 adapted for meshing engagement with the teeth 96 of the second plate 56. Each pawl 98 may also include a latch 110 at an end opposite the teeth 108.

The cam 100 may be a generally round disk having an aperture 112 and a plurality of radial latch protrusions 114 arranged around the aperture 112. The cam 100 is rotatable relative to the pawls 98 and the second plate 56 such that the latch protrusions 114 can selectively engage the latches 110 of the pawls 98 to move the pawls 98 out of engagement with the teeth 96 of the second plate 56 (i.e., into the unlocked state).

The connector disk 102 is engaged with the cam 100 and the hub 27. The connector disk 102 may include a disk portion 116 and an extrusion 118 extending perpendicularly from the disk portion 116. The disk portion 116 may have a plurality of flanges 120 extending therefrom. Each flange 120 is engaged with a corresponding one of the coil springs 104. Because each flange 120 is engaged to the corresponding spring 104, the connector disk 102 rotationally biases the cam 100 in a manner that causes the latch protrusions 114 to force the pawls 98 radially outwardly into the locked state, whereby the teeth 108 of the pawls 98 engage the teeth 96 of the second plate 56.

The extrusion 118 of the connector disk 102 is engaged with the hub 27 and the cam 100 such that rotation of the hub 27 (which is caused by rotation of the hand lever 20) causes rotation of the cam 100 to move the pawls 98 radially into and out of engagement with the teeth 96 of the second plate 56.

The hub 27 may extend through the length of the recliner heart 26 and may include a first end 122 and a second end 124. The first end 122 may engage the hand lever 20 such that the hub 27 and the hand lever 20 are rotationally fixed to each other. The hub 27 may include a rectangular-shaped aperture 126 that receives the cross member (not shown). The cross-sectional shape of the aperture 126 generally corresponds to the cross-sectional shape of a portion of the cross member such that the cross member and the hub 27 are rotationally fixed relative to each other.

With references to FIGS. 2-8, the encapsulating ring 28 is disposed between the first and second bracket plates 22, 24 and covers the recliner heart 26 at a periphery thereof, thereby preventing debris and fluid from damaging components. The encapsulating ring 28 may include a body 74 and first and second flanges 76, 78. The first flange 76 may extend radially outwardly from an axial end of the body 74 and may also extend at least partially around the body 74 (e.g., between 180 degrees and 360 degrees).

The body 74 and the rim 86 of the first plate 54 may be attached by laser welding such that a laser beam contacts a portion of the body 74 and a portion of the rim 86 of the first plate 54. In this way, material from the body 74 and material from the rim 86 of the first plate 54 are melted in the area of contact between the body 74 and the rim 86 of the first plate 54 to form a weld 95 therebetween, which reduces heat and time required to join the encapsulating ring 28 and the first plate 54. Joining the encapsulating ring 28 and the first plate 54 as described above also increases torque strength between the encapsulating ring 28 and the first plate 54. Joining the encapsulating ring 28 and the first plate 54 as described above also reduces the exposure of surrounding parts to heat, which increase durability of the recliner mechanism 18 by avoiding heat related distortions and stresses to the surrounding parts.

The first flange 76 and the second portion 32 of the first bracket plate 22 may be attached by laser welding such that a laser beam contacts a portion of the first flange 76 and a portion of the second portion 32 of the first bracket plate 22. In this way, material from the first flange 76 and material from the second portion 32 of the first bracket plate 22 are melted in the area of contact between the first flange 76 and the second portion 32 of the first bracket plate 22 to form a weld 97 therebetween, which reduces heat and time required to join the encapsulating ring 28 and the first bracket plate 22. Joining the first flange 76 and the first bracket plate 22 as described above also increases torque strength between the encapsulating ring 28 and the first bracket plate 22. Joining the first flange 76 and the first bracket plate 22 as described above also reduces the exposure of surrounding parts to heat, which increase durability of the recliner mechanism 18 by avoiding heat related distortions and stresses to the surrounding parts.

The second flange 78 may extend radially inwardly from another axial end of the body 74 to define an opening 80 and may also extend 360 degrees around the body 74.

The hand lever 20 may be rotatable between a locked position in which the recliner heart 26 is in the locked state and an unlocked position in which the recliner heart 26 is in the unlocked state. The hand lever 20 may permit rotation of the seatback 14 once the hand lever 20 is in the unlocked position and the recliner heart 26 is in the unlocked state. A torsion spring 82 may be attached to the hub 27 and the first bracket plate 22 and may rotationally bias the hand lever 20 toward the locked position.

Figure 9:
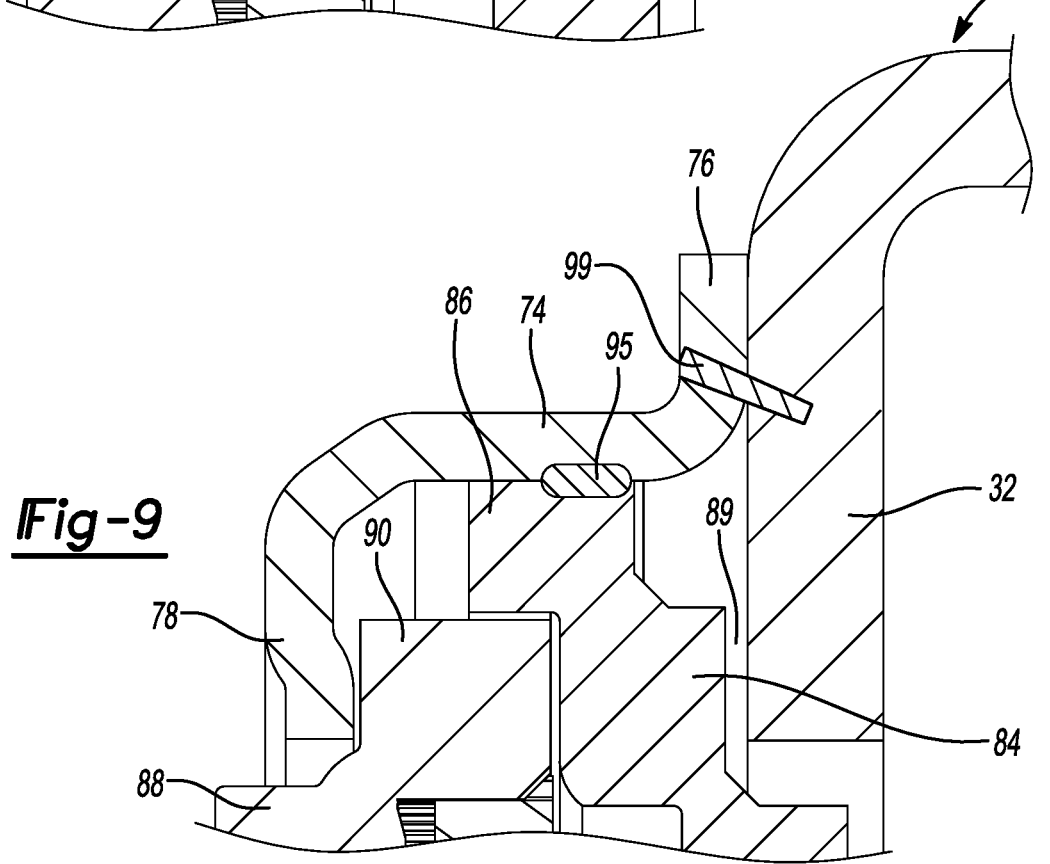
FIG. 9 is a close-up view of a portion of an alternate recliner mechanism.

In some configurations, as shown in FIG. 9, the first flange 76 and the first bracket plate 22 may be attached by laser welding such that a laser beam contacts only the first flange 76 of the encapsulating ring 28 to attach the encapsulating ring 28 and the first bracket plate 22, thereby forming a weld 99 therebetween.

With continued reference to FIGS. 1-9, a method for assembling the recliner mechanism 18 will now be described in detail. First, the encapsulating ring 28 is attached to the recliner heart 26. That is, the body 74 and the rim 86 of the first plate 54 are attached by laser welding such that a laser beam contacts a portion of the body 74 and a portion of the rim 86 of the first plate 54. The laser beam contacts the portion of the body 74 and the portion of the rim 86 360 degrees around the body 74 and the rim 86. It is understood that during attachment of the encapsulating ring 28 and the recliner heart 26, a first tooling device (not shown) may rotate the encapsulating ring 28 and the recliner heart 26 relative to the laser beam that may be at a fixed position. In some configurations, the laser beam may be rotated relative to the encapsulating ring 28 and the recliner heart 26 that are held at a fixed position by the first tooling device.

Next, the encapsulating ring 28 may be attached to the first bracket plate 22 while simultaneously attaching the second plate 56 and the second bracket plate 24. That is, the first flange 76 and the second portion 32 of the first bracket plate 22 are attached by laser welding such that a first laser beam contacts a portion of the first flange 76 and a portion of the second portion 32 of the first bracket plate 22. The second bracket plate 24 and the plate surface 88 of the second plate 56 are also attached by laser welding such that a second laser beam contacts a portion of the second bracket plate 24 and a portion of the plate surface 88 of the second plate 56. The first laser beam contacts the portion of the first flange 76 and the portion of the second portion 32 360 degrees around the first flange 76 and the second portion 32. The second laser beam contacts the portion of the second bracket plate 24 and the portion of the plate surface 88 360 degrees around the second bracket plate 24 and the plate surface 88.

It is understood that during attachment of the encapsulating ring 28 and first bracket plate 22, and the second plate 56 and the second bracket plate 24, a second tooling device (not shown) may rotate the encapsulating ring 28, the recliner heart 26 and the first and second bracket plates 22, 24 relative to the first and second laser beams that may be at a fixed position (i.e., the first and second laser beams may extend parallel to each other). In some configurations, the first and second laser beams may be rotated relative to the encapsulating ring 28, the recliner heart 26 and the first and second bracket plates 22, 24 that are held at a fixed position by the second tooling device.

It should be understood that during laser welding, using the techniques described above, a user may adjust the speed and power of the laser beam at any point throughout the welding process. It should be also understood that the path (e.g., sine-wave-shaped path or overlapping path) in which the laser beam travels during the welding process can also be adjusted to increase the width of the weld, which facilitates the melting of material between the components being welded.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A recliner mechanism comprising:
   a first bracket plate;
   a second bracket plate;
   a recliner heart mounted to the first and second bracket plates and operable in an unlocked state permitting relative rotation between a seatback and a seat bottom and a locked state preventing relative rotation between the seatback and the seat bottom, wherein the recliner heart includes a first plate and a second plate that are rotatable relative to each other when the recliner heart is in the unlocked state, and wherein the first and second bracket plates are rotatable relative to each other when the recliner heart is in the unlocked state; and
   an encapsulating ring contacting and fixed to the first bracket plate, wherein the encapsulating ring includes a body, a first flange, and a second flange,
   wherein the body of the encapsulating ring is disposed radially outward relative to outer rims of the first and second plates such that the body surrounds the outer rims,
   wherein a first weld is between the first bracket plate and the first flange of the encapsulating ring to fixedly attach the encapsulating ring to the first bracket plate,
   wherein a second weld is between the first plate and the body of the encapsulating ring to fixedly attach the encapsulating ring to the first plate, and
   wherein the second flange is disposed axially between the second bracket plate and the outer rim of the second plate.

2. The recliner mechanism of claim 1, wherein the first flange extends radially outwardly from a first axial end of the body, and wherein the second flange extends radially inwardly from a second axial end of the body.

3. The recliner mechanism of claim 2, wherein the first flange extends at least partially around the body.

4. The recliner mechanism of claim 1, wherein a third weld is between the second plate and the second bracket plate to attach the second plate to the second bracket plate.

5. A recliner mechanism comprising:
   a first bracket plate;
   a second bracket plate;
   a recliner heart mounted to the first and second bracket plates and operable in an unlocked state permitting relative rotation between a seatback and a seat bottom and a locked state preventing relative rotation between the seatback and the seat bottom; and
   an encapsulating ring disposed between the first and second bracket plates, the encapsulating ring contacting and fixed to the first bracket plate,
   wherein the encapsulating ring includes a body and a flange, and wherein the flange extends radially outwardly from an axial end of the body, and
   wherein the recliner heart includes a first plate and a second plate, and wherein a first weld is between the second plate and the second bracket plate to attach the second plate to the second bracket plate.

6. The recliner mechanism of claim 5, wherein a second weld is between the flange of the encapsulating ring and the first bracket plate.

7. The recliner mechanism of claim 6, wherein the recliner heart includes a first plate and a second plate rotatable relative to the first plate, and wherein a third weld is between the body of the encapsulating ring and the first plate to attach the encapsulating ring to the first plate.

8. The recliner mechanism of claim 5, wherein a second weld is between the body of the encapsulating ring and the first plate to attach the encapsulating ring to the first plate.

9. The recliner mechanism of claim 8, wherein the first plate includes a plate surface and a rim extending around the plate surface, and wherein the second weld is between the rim and the body of the encapsulating ring.

10. The recliner mechanism of claim 5, wherein the second plate includes a plate surface and a rim extending around the plate surface, and wherein the first weld is between the plate surface and the second bracket plate.

11. A method for assembling a recliner mechanism, the method comprising:
- attaching an encapsulating ring of the recliner mechanism to a recliner heart of the recliner mechanism, the encapsulating ring covering a periphery of the recliner heart;
- attaching the encapsulating ring to a first bracket plate of the recliner mechanism; and
- attaching the recliner heart to a second bracket plate of the recliner mechanism,
- wherein the recliner heart and the encapsulating ring are disposed between the first and second bracket plates when the encapsulating ring is attached to the first bracket plate and the recliner heart is attached to the second bracket plate,
- wherein the encapsulating ring and the first bracket plate are attached by laser welding such that a first laser beam contacts a portion of the encapsulating ring and a portion of the first bracket plate, and
- wherein the recliner heart and the second bracket plate are attached by laser welding such that a second laser beam contacts a portion of the recliner heart and a portion of the second bracket plate.

12. The method of claim 11, wherein the encapsulating ring and the recliner heart are attached by laser welding such that a laser beam contacts a portion of the encapsulating ring and a portion of the recliner heart.

13. The method of claim 12, wherein the encapsulating ring includes a body and a flange extending radially outwardly from an axial end of the body, and wherein the recliner heart includes a first plate and a second plate rotatable relative to the first plate.

14. The method of claim 13, where the laser beam contacts a portion of the body and a portion of the first plate to attach the encapsulating ring to the first plate.

15. The method of claim 11, wherein the encapsulating ring includes a body and a flange extending radially outwardly from an axial end of the body, and wherein the recliner heart includes a first plate and a second plate rotatable relative to the first plate.

16. The method of claim 15, where the first laser beam contacts a portion of the flange and a portion of the first bracket plate to attach the encapsulating ring to the first bracket plate.

17. The method of claim 16, where the second laser beam contacts a portion of the second plate and a portion of the second bracket plate to attach the recliner heart to the second bracket plate.

* * * * *